United States Patent [19]

Miller

[11] Patent Number: 4,751,493

[45] Date of Patent: Jun. 14, 1988

[54] KIT FOR RETROFITTING AUTOMOBILES WITH DECELERATION WARNING LIGHT

[76] Inventor: Terry G. Miller, 1005 LaVilla Rd., Punta Gorda, Fla. 33950

[21] Appl. No.: 79,562

[22] Filed: Jul. 27, 1987

Related U.S. Application Data

[63] Continuation-in-part of Ser. No. 809,477, Dec. 16, 1985, Pat. No. 4,686,503.

[51] Int. Cl.$^4$ ............................................. B60Q 1/26
[52] U.S. Cl. ..................................... 340/71; 340/87; 362/61
[58] Field of Search .................. 340/66, 71, 72, 87, 340/97; 362/61, 80; 200/61.89; 248/DIG. 4

[56] References Cited

U.S. PATENT DOCUMENTS

| | | | |
|---|---|---|---|
| 2,853,572 | 9/1958 | Breeze | 340/71 X |
| 3,320,586 | 5/1967 | Wagner | 340/66 |
| 3,823,284 | 7/1974 | Hoffman | 200/61.89 |
| 4,173,012 | 10/1979 | Burger | 340/71 |
| 4,297,550 | 10/1981 | Leighton | 200/61.89 |
| 4,575,782 | 3/1986 | Levine et al. | 340/87 X |
| 4,602,320 | 7/1986 | Tomkin et al. | 362/80 |

FOREIGN PATENT DOCUMENTS 2028024 2/1980 United Kingdom ................ 340/71

*Primary Examiner*—Joseph A. Orsino
*Assistant Examiner*—Brian R. Tumm
*Attorney, Agent, or Firm*—Charles J. Prescott; Raymond H. Quist

[57] ABSTRACT

A kit for retrofitting automobiles, primarily standard passenger cars, with a rear deck warning light to warn the drivers of following vehicles of the removal of the driver's foot from the accelerator pedal. The kit includes a self-adhesive rear deck lamp housing, a length of double wire cable that may be fed through the body of the car to the trunk and attached to leads from the lamp housing; an adjustable switch bracket for mounting to the depending pivot bracket of an accelerator pedal pivoting linkage; a switch mounted on the bracket and wiring leads for connection to the cable; a device for tapping into a source of voltage at the fuse box of the vehicle; and a self-adhering miniature lamp electrically connected to the switch by a self-adhering flat ribbon cable. When the kit is properly installed, the removal of the driver's foot from the accelerator pedal closes the switch and lights the rear deck lamp and the miniature lamp which is secured to the outside surface of the dashboard within easy view of the driver. An alternative lamp housing having three interchangeable visors that allow the lamp to adapt to different angled rear windows.

15 Claims, 3 Drawing Sheets

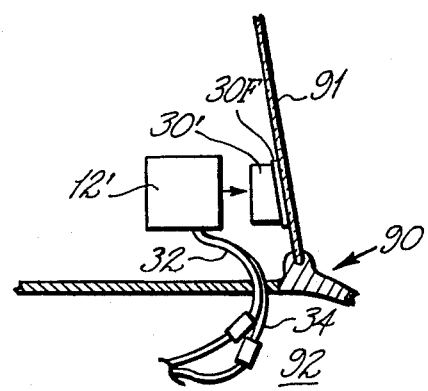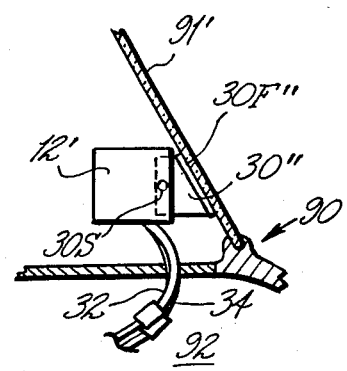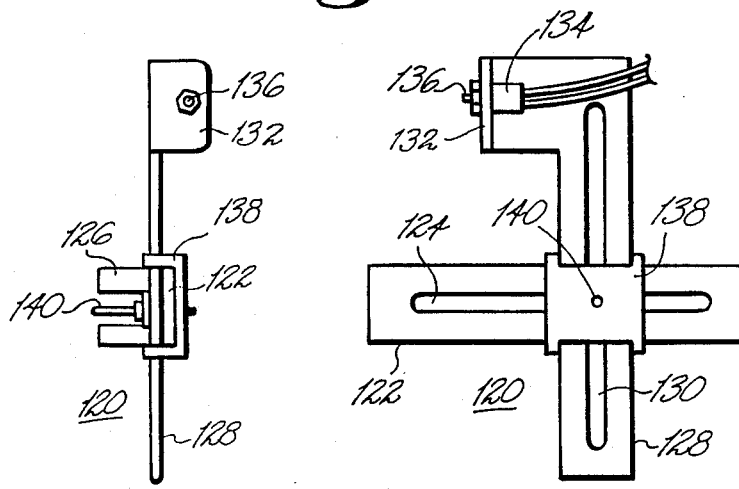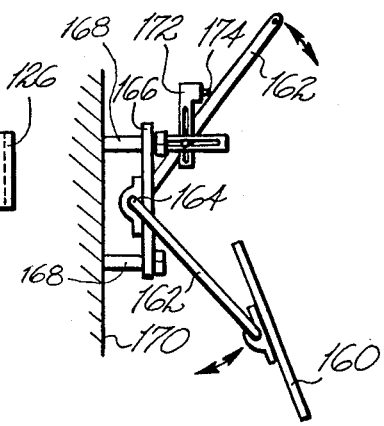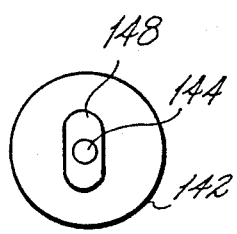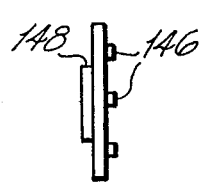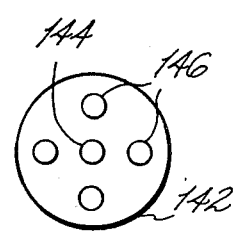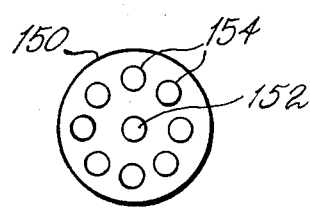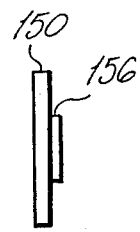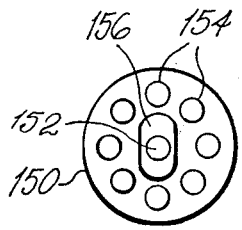

KIT FOR RETROFITTING AUTOMOBILES WITH DECELERATION WARNING LIGHT

This application is a continuation-in-part of Ser. No. 809,477, Dec. 16, 1985, U.S. Pat. No. 4,686,503 issued Aug. 11, 1987.

BACKGROUND OF THE INVENTION

1. Field of the Invention

This invention relates generally to automobile deceleration warning lights, and more particularly to a new and improved kit for retrofitting an automobile with a deceleration warning light.

2. Description of Related Art

A number of proposals for manufacturing vehicles with deceleration warning systems have been proposed in the past. These include U.S. Pat. Nos. 3,320,586 issued on May 16, 1987 to T. Wagner; 3,336,450 issued on Aug. 14, 1967 to P. Rainer; 3,414,879 issued on Dec. 3, 1968 to J. R. Holland; 3,501,742 issued on Mar. 17, 1970 to L. E. Ellison; 3,806,870 issued on Apr. 23, 1974 to E. A. Kalajian; 3,921,750 issued on Nov. 25, 1975 to M. Shames; 4,149,141 issued on Apr. 15, 1979 to K. Tanimura.

Such systems, however, require extensive modification of the conventional automobile and are difficult to retrofit into existing cars.

One system, that of U.S. Pat. No. 4,224,598 issued on Sept. 23, 1980 to Ostrowski, has specifically addressed the problem of retrofitting such a system into a vehicle, but even it requires addition of three switches and revising wiring under the hood.

Thus, all known prior decelerator signal systems must be either factory installed or installed by an electrician or mechanic and are not easily installed by the average driver. The mounting of the switch which controls the deceleration light is particularly difficult since the switch button or lever must be accurately positioned to cause the switch to close and open properly.

SUMMARY OF THE INVENTION

In overcoming one or more of the problems of the prior art, the present invention provides a kit that is easy to use, requires no underhood modifications to the vehicle, and can be easily installed with a minimum use of tools such that the average driver can retrofit his or her car using the kit.

Such a kit constructed in accordance with the present invention comprises a lamp housing and electric light bulb unit equipped with an amber lens. The housing is adapted for mounting at the rear of an automobile, so that the light bulb could, when energized, emit light through the lens, to be seen as an amber warning light. The bulb is energized by the application of electric power between electric leads.

The kit also includes a length of cable of sufficient length to run a circuitous path between the area of the accelerator pedal to the area of the housing and be attached to the leads.

A switch support assembly for adjustably mounting the switch to the pivot bracket of the accelerator linkage is also provided. The assembly includes two legs, the relative position of which can be adjusted so that a switch mounted on one leg may be positioned and adjusted near the automobile accelerator pedal, to have the switch be activated upon release of the driver's foot from the accelerator pedal, and the kit also including means for connecting the cable to the fuse box of the automobile.

The invention, together with the advantages thereof, may best be understood by reference to the following description taken in connection with the accompanying drawings, in the several figures of which, like reference numerals identify like elements.

BRIEF DESCRIPTION OF THE DRAWINGS

FIG. 7 is a side view of a portion of a vehicle having parts of the kit of FIG. 6 installed therein;

FIG. 8 is a similar view to that of FIG. 7, but of a different vehicle having parts from the kit of FIG. 7 installed in it;

FIG. 9 is a front elevation of a switch support assembly;

FIG. 10 is a side elevation of the switch support assembly;

FIG. 11 is a front elevation of one half of a mating pair of an angular adjusting device;

FIG. 12 is a side elevation of the one half of FIG. 11;

FIG. 13 is a rear elevation of the one half of FIG. 11;

FIG. 14 is a front elevation of the other half of a mating pair of an angular adjusting device;

FIG. 15 is a side elevation of the other half of FIG. 14;

FIG. 16 is a rear elevation of the other half of FIG. 14; and

FIG. 17 is a side elevation of a portion of an accelerator linkage with a switch support assembly installed.

DETAILED DESCRIPTION OF PREFERRED EMBODIMENT

Figure 1:
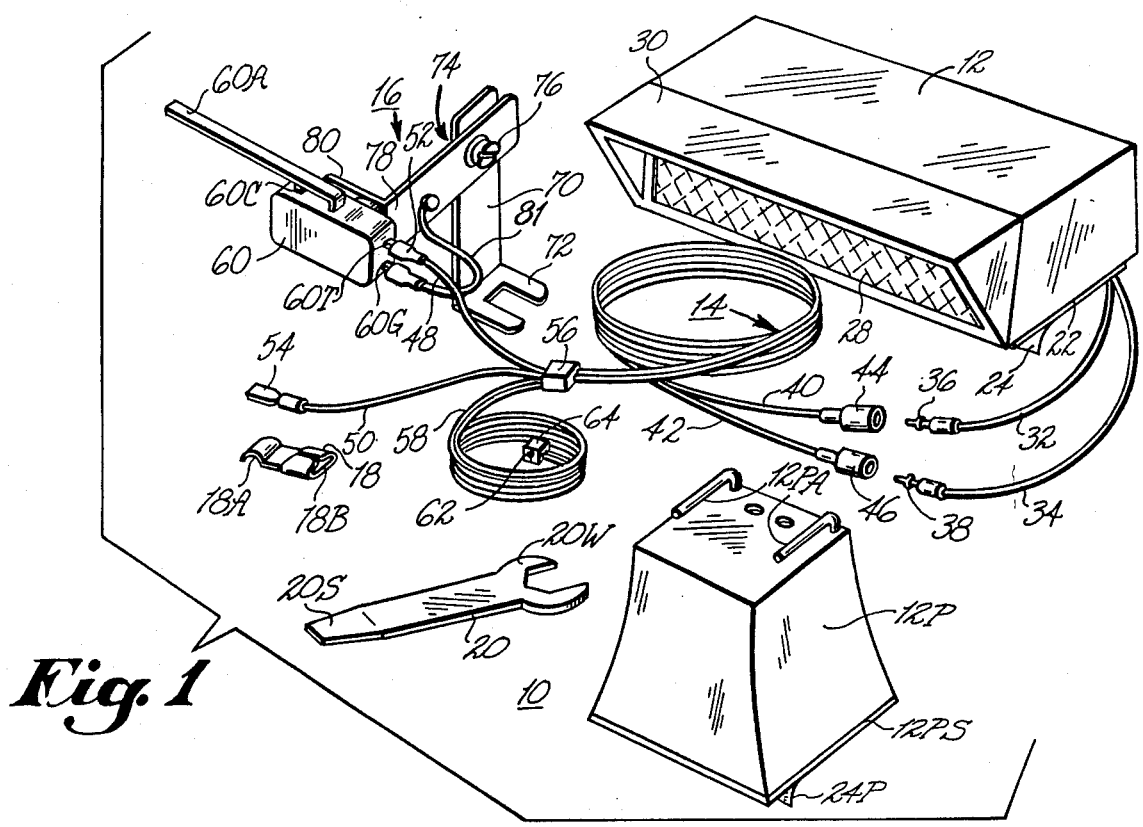
FIG. 1 is a perspective view of the parts of a kit made in accordance with the present invention.

Referring now to FIG. 1, there is depicted a kit constructed in accordance with the present invention and generally designated by the number 10. The kit 10 includes a rear deck housing 12, cable unit 14, and a switch support assembly and switch unit 16, as well as an adapter 18 and an optional wrench-screwdriver tool 20.

Figure 2:
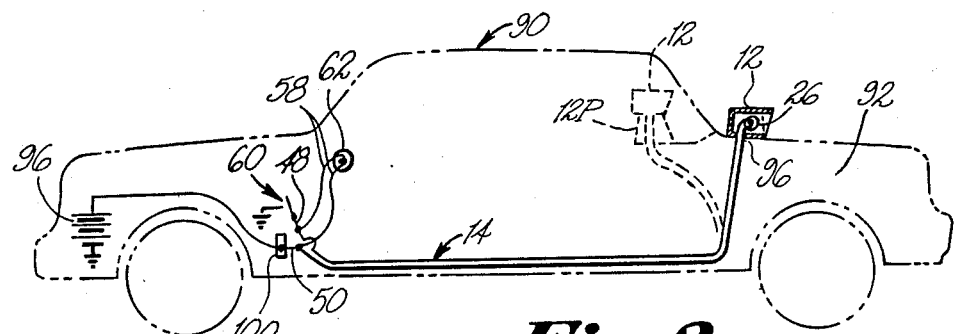
FIG. 2 is a schematic circuit diagram of the installed parts of the kit of FIG. 1 installed on a vehicle which is shown in phantom outline.

The housing 12 is preferably adapted to be self-adhering inside or outside to the rear deck of a standard passenger vehicle, as shown in solid lines in FIG. 2, by having affixed at its bottom surface double-sided adhesive foam layer 22. This adhesive layer 22 is covered by release paper 24. The housing 12 encloses a replaceable electric bulb 26 (FIG. 2) and its socket. The bulb 26, when lit, causes light to pass through an amber lens 28 (FIG. 1) which is preferably hooded by a visor 30. The bulb 26 and its socket are connected to a pair of insulation covered wires 32 and 34, which project from holes in the bottom of the housing 12 and terminate in electrical connectors 36 and 38.

The housing 12 may also be mounted on the inside of the rear window (as shown in dashed outlining in FIG. 2) on an optional pedestal 12P which preferably has a self-adhering bottom surface 12PS covered by release paper 24P. The pedestal 12P preferably has a pair of forward projecting arms 12PA which are adapted to be received in matching holes (not shown) in the rear surface of the housing 12. (The bottom adhesive 22 and paper 24 is so arranged and scored that only the portion over the pedestal 12P need be removed.) The pedestal 12P preferably also has openings through it for receiving the lines 32 and 24, so that they are not exposed.

The cable unit 14 comprises a double conductor cable which is split at one end into two separate insulated wire leads 40 and 42 which respectively terminate in female electrical connectors 44 and 46, which adapt to receive the connectors 36 and 38.

The cable unit 14 double lead portion is at least long enough to run from the accelerator pedal area of a passenger car into the trunk, via any convenient path, such as under the dash, beneath the door threshold panel(s), under the carpeting, beneath the rear seat. At its other end, it is also split into two separate insulated wire leads 48 and 50. The lead 48 is relatively short and terminates with a female connector 52 which is shown connected to one of the two conventional male connectors of a microswitch 60, which forms part of the unit 16. The other lead 50 is preferably longer and is terminated in a male electrical blade contact 54 which is sized and shaped to be received into the fuse box which is currently in use on such General Motors cars as the 1985 Chevrolet. It is known that the fuse box known as the "glass fuse terminal" was replaced, by 90% of the auto manufacturers, with the wedge or ACT fuse terminal, about the year of 1980 and thereafter. With such fuse boxes, the blade member 54 may be simply pushed into the fuse box to establish a good and secure connection. The blade member 54 is preferably approximately one thirty-second of an inch thick, one-quarter of an inch wide, and three-eights of an inch long, and made up of conductive metal.

For some fuse boxes (glass fuse terminal), for example, those used prior to 1980, this connection 54 is not easily secured. For these fuse boxes, the optional adapter unit 18 must be employed. When so used, the blade member 54 is pushed into the base 18B of adapter 18, and then the blade 18A of the adapter may be secured into that glass type of fuse box. The adapter 18 has a curved section adapted to be seated between the glass fuse metal end and the fuse box receiving socket for that end.

The twin leads of the cable unit 14 are each tapped into an insulating block 56 and a twin lead flat or ribbon cable 58 leads out from this block 56. At the end of the ribbon cable 58 is an encapsulated miniature lamp 62 (such as ones used as miniature "Italian" Christmas tree lights) encased in small insulating block 64 as will be explained in more detail below.

As shown in FIG. 1, the switch support assembly and switch unit 16 comprises a first leg 70 having a foot 72 laterally extending from one end. A single locking screw 76 has a shank which passes through hole 74 in the leg 70 and is secured to a second leg 78 through an opening in leg 78. Leg 78 includes a switch support ear 80 laterally extending from one end of leg 78. The switch unit 60 is secured by a single screw and nut 82 (shown in FIG. 3) to this switch support ear 80. By loosening the screw 76, leg 78 may be pivoted about the screw 76, and by loosening the nut 82, the switch 60 may be pivoted on switch support ear 80.

The microswitch 60 has an extending arm 60A which is normally spring-based away from a contact 60C which when depressed makes contact to complete the circuit between its terminals 60T and 60G. The contact 60G is permanently connected to a flexible lead 81 which is in turn electrically connected by soldering or other suitable means to the member 78. This lead 81 is preferably long enough to allow the switch to be rotated about one-half of a turn. (The lead 81 or preferably, and as shown, the outside of the contact member 52 should be covered with an insulating material to prevent short circuiting of the switch by the lead 81.)

The tool 20 includes a wrench end 20W and screwdriver end 20S which are sized respectively to fit the nut 82 and screw 72 so that it can be used to install the kit.

As best shown in FIG. 2, the kit is installed in a standard passenger car 90 by running the end of the cable unit 14 which includes the connectors 44, 45 from the area of the accelerator pedal through the body of the vehicle 90 and into the interior of the trunk 92. This can be done in any number of ways, and the length of the cable unit 14 is long enough to accommodate these various paths. A length of sixteen feet has been found to be a good length for this purpose. As mentioned above, the cable 14 may go under the floor carpeting, or under the removable threshold covers provided in General Motors cars. It can also be run in the channel used by the factory-installed wiring harness (although that is often difficult to do). In most cases, the cable unit 14 can enter the trunk through existing openings behind the rear seat of the vehicle 90, but in some cases, it may be necessary to punch a small hole in the trunk lining. (This lining is usually cardboard-like sheeting, and such a hole can be easily made if necessary or convenient.)

Although not shown for ease of depicting and explaining the operation, it should be understood that the voltage source 96 is preferably one that is supplied only when the automobile ignition switch is closed and one that is properly fused. Such sources are commonly available at the fuse box 100.

As will be explained below in connection with FIG. 3, the switch 60 is secured to be operated and have one side connected to chassis ground; the lead 50 secured to the fuse box 100 (and, thus, as indicated in FIG. 2, to a source of voltage indicated at 96); and the lamp 62 is positioned to be viewed by the driver. As can be appreciated best from FIG. 2, closure of the switch 60 completes a circuit, through the source of voltage 96, the fuse box 100, one conductor of the cable 14 through the bulb 26, the other conductor of the cable 14 and the switch 60 to chassis ground. This lights the bulb 26, which of course shines amber light from the lens 12, to be seen by any following driver.

Closure of the switch 60 also completes a circuit from source 96, fuse box 100, line 50, one conductor of cable 58 through miniature bulb 62, the other conductor of cable 58 and switch 60 to chassis ground. Thus, lamp 62 is lighted at the same time as the rear amber light.

This light serves as an "awareness light", being installed on the dashboard area for convenient viewing by the driver and has a bulb with a very low candle power. This light being connected to the switch unit, activation would coincide with the rear warning light at the rear of the car.

The purpose of the awareness light is to help the driver to be aware of when the rear warning light is on or off. The advantage to this information would enable the driver to better use the rear light and maximize its function under traffic conditions such as slowing, turning and pre-braking. With the awareness light in plain view, but not in a distractive area, the driver will know how much lead time will enable the following driver to be aware of the intention to brake. Learning to use this lead time can be an asset to the crucial reaction time and braking distance.

Figure 3:
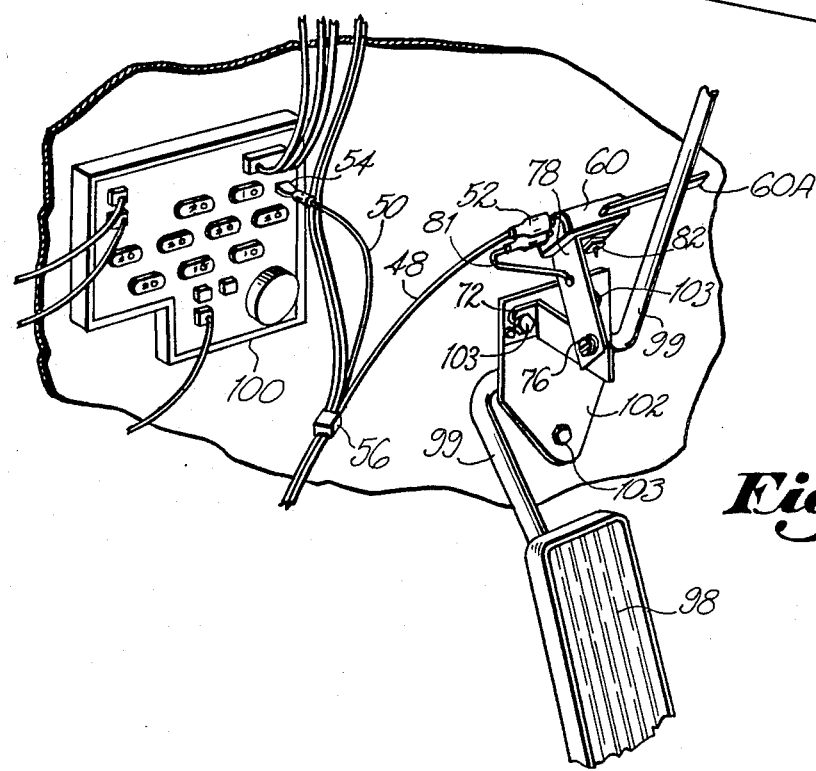
FIG. 3 is a perspective view of a portion of the vehicle of FIG. 2, illustrating the manner of installing some of the parts of the kit.

Referring now to FIG. 3, the method of installing and adjusting the switch support assembly and switch unit 16 will now be discussed. The present invention is of special utility in retrofitting a deceleration warning light to General Motors cars and other cars that have an accelerator pedal 98 that moves a lever 99 which is pivoted from pivot bracket 102. Pivot bracket 102 is secured by means of three bolts 103 having bolt heads with a span of about three-eights inch; that is, the same span as that of the wrench 20W of the tool 20 provided with the kit 10.

Thus, the first step in securing the unit 16 is to loosen one of the bolts 103, preferably the one shown in FIG. 3, slip foot 72 under it, and, after positioning the unit 16 so that the pivotal axis formed by the screw 76 is approximately parallel to the pivot of lever 99, to re-tighten the bolt 103.

The next step is to loosen the screw 76 using the blade 20S of the tool 20 and pivot leg 78 so that the member 60A of the switch 60 is closed by lever 99, when the pedal 98 is not depressed but it opened when the pedal is depressed. To this end, if necessary, the nut 82 may be loosened and retightened (using wrench 20W of tool 20) to position the switch 60 in the best position for this end.

To secure the wires 48, 50 and cable 14 out of the way, the block 56 is preferably provided with two-sided adhesive on one side. This adhesive is preferably covered by release paper. Thus, the block 56 can be easily secured to any desired position under the dash.

Once switch support assembly and switch unit 16 is secured as discussed above, the connector 52 may be inserted and the blade 54 inserted in the fuse box 100.

Figure 4:
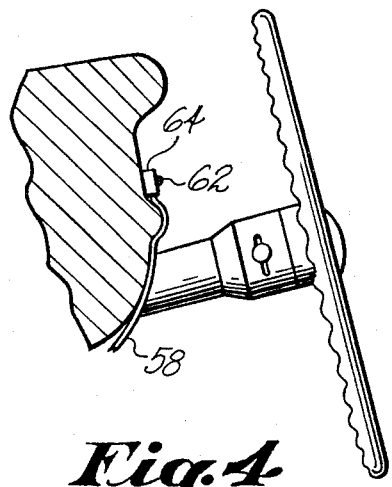
FIG. 4 is a side view, partly in section, of a portion of a vehicle of FIGS. 2 and 3, showing the manner of installing another part of the kit.

At this point, the system is operational, and with the ignition "on", it can be tested by depressing the pedal 98. This should light the bulbs 62 and 26, and they should then be extinguished as the pedal is depressed. If the system is operating properly, the installer may run the flat ribbon cable under the dash and secure it in place as shown in FIG. 4.

Figure 5:
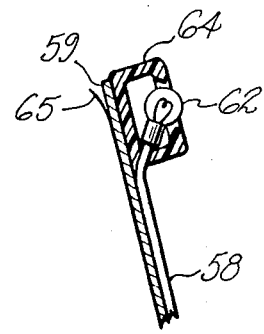
FIG. 5 is a sectional detail of one part of the kit.

To aid in its installation and as best shown in FIG. 5, the block 64 and ribbon cable 58 are provided with self-adhering adhesive 59 at one side. The adhesive 59 is covered by release paper 65. When the installer has selected his location for the block 64 and cable 62, he need only strip off the paper and press the block and ribbon cable in place.

For purposes of illustration and not for limitation the following values and identification are submitted. As will be appreciated by those in this art, many other makes and specific units may be employed, and the inventor himself may well decide in the future to vary from these as economics of manufacturing dictate or experience indicates. However, at the present time, these are preferred:

Switch 60: Model No. V3L-2425-D8 made by Micro-switch, Honeywell Division

Cable 14: #20 guage wire made by J T & T Production Corp.

Member 70: 2½×½ inches, 16 guage thick steel sheet metal

Member 78: 2½×½ inches, 16 guage thick steel sheet metal

Bulb 62: No 53 made by General Electric

Bulb 26: No. T1893 made by General Electric

Adhesive Layer 22: Made by 3M Corp.

Blocks 56, 64: Insulating Epoxy Encasements

Adapter 18: 0.250 Fuse tap/clip Model No. 1212H made by J T & T Production Corp.

Figure 6:
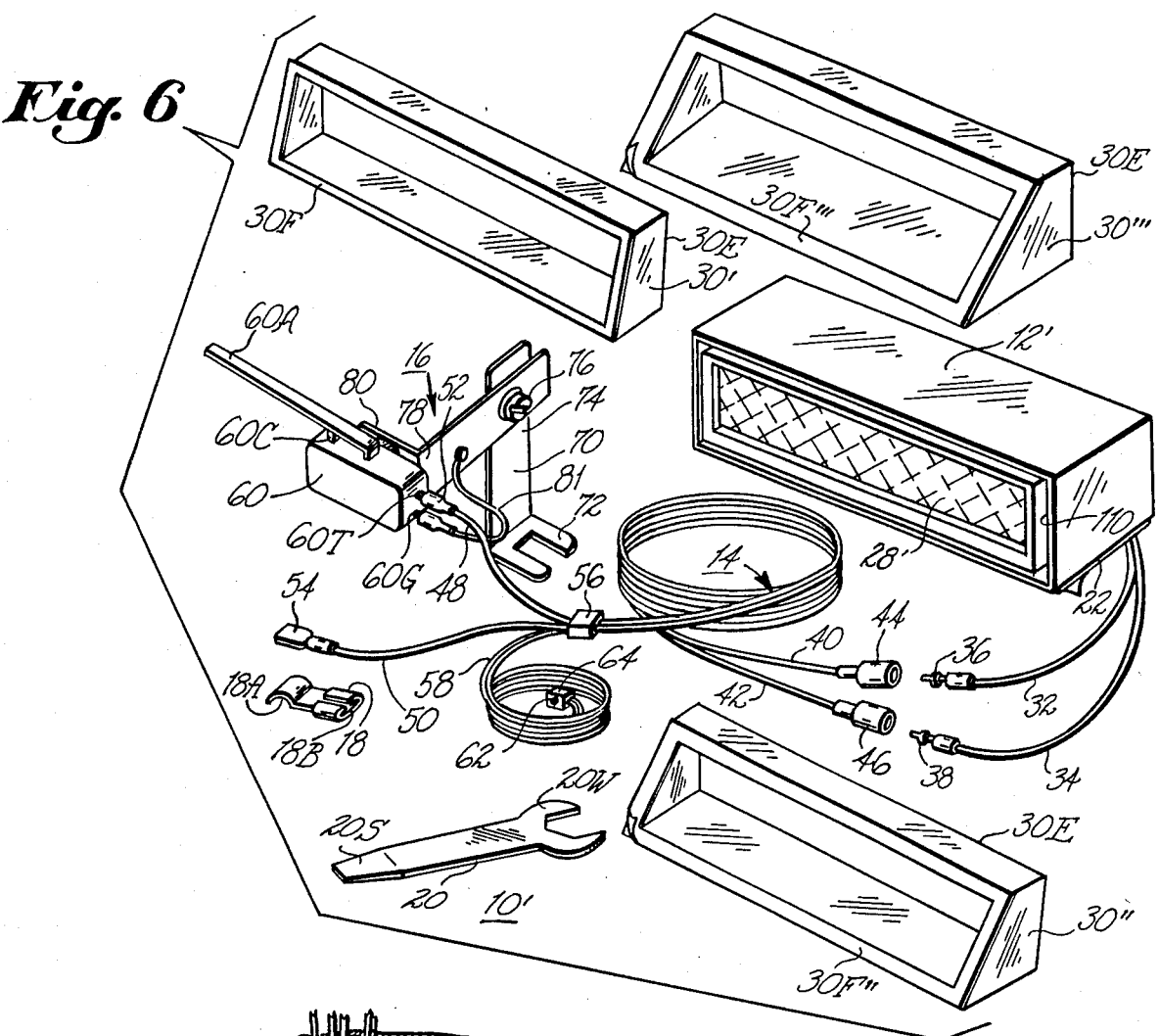
FIG. 6 is a perspective view of the parts of an alternate second kit, being a second embodiment of the invention.

Referring to FIG. 6, an alternative embodiment 10' of the kit of the present invention is there depicted. This embodiment 10' differs from the previous embodiment in the housing 12' which is provided with a recessed visor-receiving groove 110 that encircles its lens 28'. A plurality of visors 30', 30" and 30'" are provided, each of which has a rear portion which is sized and shaped identically and so as to closely fit into the groove 110. The rear edges 30E of the visors may be provided with release paper covered glue for permanently mounting them into the housing 12' or other suitable means of securing them in place, such as snap detents or screw fasteners provided. Other release media may be used in lieu of release paper.

The front of the visor 30' is inclined at about 80 degrees and is provided with a layer of double-sided foam adhesive 30F covered by a layer of release paper.

The foam 30F surrounds and covers the forward edge of the visor 30'. Similar adhesive foam-release paper 30F" and 30F'" are provided on the visors 30" and 30'". These latter, however, have fronts which are angled at approximately seventy degrees and sixty degrees, respectively.

The visors 30', 30" and 30'" are made of opaque material and are preferably formed by extruding plastic in the rectilinear shape shown and cutting the extruding plastic in the rectilinear shape shown and cutting the extrusions at the desired angles. By making two of each kind at the same time, no wasted material will result. That is, the extrusion may be cut at ninety degrees to form edge 30E, then at 80 degrees to form one basic visor-shape for a visor 30', and then at 90 degrees again to form a second basic shape for another visor 30'.

As indicated in FIGS. 7 and 8, the visors allow the kit 10' to be adapted to the interior surface of any particular common rear window 91, 91' and also serve to mount the housing 12' on the window without there being any light reflected back into the vehicle by the inside surface of the rear window.

In installation of the kit 10', the same method may be followed as in kit 10' for the common parts. The housing 12' may also be installed on the rear deck of the trunk outside of the window by the use of the adhesive 22. In this case, one of the visors 30', 30" or 30'" is turned upside down from the position shown in FIG. 6 and installed in the groove 110 prior to securing the housing 12' on the trunk deck.

When installed inside the car, the visor 30', 30" or 30'", whichever best fits the angle of the window 91 or 91', is preferably first affixed as shown in FIG. 7 and then the housing 12' positioned and fitted onto it. The strength of the adhesive of tape 30F is sufficient to hold and support the lightweight housing 12' as well as the visor 30', 30" and 30'".

As shown in FIG. 8, the housing 12' may be secured by means of a screw 30S through it and into the portion of the visor 30''' seated in the groove 110.

Turning now to FIGS. 9 and 10 an alternative switch support assembly 120 will now be described. A first longitudinally extending leg 122 has a longitudinally extending slot 124. Foot 126 extends laterally from one end of leg 122 and contains a slot to permit leg 122 to be secured to pivot bracket 102 as described above with respect to leg 78 in FIG. 3. A second leg, longitudinally extending leg 128 having longitudinally extending slot 130 has switch support ear 132 extending laterally at one end. Switch 134, having operating button 136, is mounted on switch support ear 132. Clamp 138 is positioned to hold legs 122 and 128 at right angles when wing headed bolt 140 has its shank passing through slots 124 and 130, and is threaded securely into clamp 138. It will be observed that the shank of bolt 140, when loosened, permits legs 122 and 128 to be laterally adjusted with respect to one another. This permits operating button 136 to be positioned over a wide range of locations.

Turning now to FIGS. 11-16, a two part angularly adjustable unit which may be substituted for clamp 138 will be described. One half 142 of this unit is shown in FIGS. 11-13 and has a central opening 144 through which the shank of bolt 140 of FIGS. 9 and 10 may be passed. The front surface also includes four regularly spaced protrusions 146. The back surface of half unit 142 includes a protruding and longitudinally extending hub 148 having a diameter sized to fit within slots 124 and 130, and preferably about the same thickness as legs 122 and 128. The other half unit 150 also has a central opening 152 through which the shank of bolt 140 may be passed. Half unit 150 has a plurality of regular spaced holes 154 which are positioned and sized to receive the protuberances 146. A longitudinally extending and protruding hub 156 is provided on the reverse side of other half unit 150. In use, half units 142 and 150 are positioned between legs 122 and 128 with a hub 148 or 156 positioned in the slot 124 or 130. Legs 122 and 128 are then rotated with respect to each other until a desired angular relationship is achieved. Legs 122 and 128 are then clamped together with a nut and bolt. In this manner legs 122 and 128 can be given any angular relationship, whereas clamp 138 limits them to an approximate right angle relationship.

The switch support assembly of FIGS. 9 and 10 is shown in position in FIG. 17, as will now be described. Accelerator pedal 160 is secured to one end of lever 162 which has pivot 164. Pivot 164 is secured to pivot support 166, which is in turn mounted by headed fasteners such as through bolts 168 to fire wall 170. Switch support assembly 172 is held by one of the through bolts so as to position switch operating button 174 where it will be pressed by lever 162 when accelerator pedal 160 is released.

It should now be appreciated that a novel kit for retrofitting an automobile has been devised that is easy to install without the need for modifications under the hood and has other advantages over prior such systems.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

I claim:

1. A deceleration warning light kit for installation in an automobile having an accelerator linkage controlled by a pedal and including a lever having a pivot secured to a pivot bracket mounted on the fire wall by a plurality of releasable headed fasteners, said automobile also having a fuse box and a rear structure upon which a warning light can be mounted, said kit comprising:
   a lamp housing having an electric light bulb mounted therein and an amber lens;
   mounting means for securing said lamp housing to the rear structure of the automobile;
   a switch support assembly;
   said switch support assembly having a first longitudinally extending leg and a foot extending laterally from one end of said first leg;
   said foot adapted to be secured to the pivot bracket by the head of one of the plurality of headed fasteners;
   said first leg having a longitudinally extending slot therein;
   said switch support assembly having a second longitudinally extending leg and a switch support ear extending laterally from one end of said second leg;
   said second leg having a longitudinally extending slot therein;
   said switch support assembly having a clamp including a shank extending through said slots of said first and second legs, and an angular adjustment retaining device, whereby said first and second legs may be secured together at a desired position along each of said longitudinally extending slots and at a desired angular relationship to each other;
   a switch mounted on said switch support ear;
   an insulated cable of sufficient length to run a circuitous path between the fuse box, said switch and said lamp housing;
   said cable having connectors for making connections to said fuse box, said switch and said electric light bulb; and
   said cable containing at least one conductor.

2. The kit of claim 1 for an automobile having a dash above the accelerator pedal, further including:
   an indicator lamp electrically connected with said electric light bulb so as to be lighted when said light bulb is connected to electric power and out when said light bulb is not connected;
   a small cross section insulated electrical cable, to which said indicator lamp is connected at its end and which is so sized in length and so constructed so as to allow said indicator lamp to be mounted on the dash.

3. The kit of claim 2, wherein:
   said small cross-section cable and said indicator lamp have adhesive affixed to them, said adhesive being covered by a release media so that said small cross-section cable and said indicator lamp can be secured in place by removing said release media and being pressed in place.

4. The kit of claim 1 for an automobile having a rear window, wherein:
   said mounting means includes a pedestal which may be secured to the bottom of said lamp housing whereby said lamp housing may be easily mounted inside the automobile adjacent the rear window.

5. The kit of claim 1 for an automobile having a rear window, wherein:
- said lamp housing includes a visor mount for receiving and mounting a visor;
- at least two visors, each having common means for being secured to said visor mount but having different-angled front surfaces providing adaptation to closely fit the interior surface of automobile rear windows of differing angles; and
- said housing being capable of being mounted outside of the window at the rear of an automobile or inside the rear window of an automobile of the type corresponding to one of the visors without initial reflection of light from the inside of the rear window by securing the visor to the housing and against the inside surface of the rear window.

6. The kit of claim 5, wherein:
- the window edge of the visors is made of foam so as to more closely conform to the inside surface of the rear window of the automobile.

7. The kit of claim 5, wherein:
- said visors have adhesive at their window edge so that they may be affixed to the inside surface of the window.

8. A deceleration warning light kit for installation in an automobile having an accelerator linkage controlled by a pedal and including a lever having a pivot secured to a pivot bracket mounted on the fire wall by a plurality of releasable headed fasteners, said automobile also having a fuse box and a rear structure upon which a warning light can be mounted, said kit comprising:
- a lamp housing having an electric light bulb mounted therein and an amber lens;
- mounting means for securing said lamp housing to the rear structure of the automobile;
- a switch support assembly;
- said switch support assembly having a first longitudinally extending leg having a foot extending laterally from one end of said first leg and an opening through said leg;
- said foot adapted to be secured to the pivot bracket by the head of one of the plurality of headed fasteners;
- said switch support assembly having a second longitudinally extending leg having a switch support ear extending laterally from one end of said second leg and an opening through said leg;
- said switch support assembly having clamping means including a shank extending through said openings of said first and second legs, whereby said first and second legs may be secured together at a desired angular relationship to each other;
- a switch mounted on said switch support ear;
- an insulated cable of sufficient length to run a circuitous path between the fuse box, said switch and said lamp housing;
- said cable having connectors for making connections to said fuse box, said switch and said electric light bulb; and
- said cable containing at least one conductor.

9. The kit of claim 8 for an automobile having a dash above the accelerator pedal, further including:
- an indicator lamp electrically connected with said electric light bulb so as to be lighted when said light bulb is connected to electric power and out when said light bulb is not connected;
- a small cross section insulated electrical cable, to which said indicator lamp is connected at its end and which is so sized in length and so constructed so as to allow said indicator lamp to be mounted on the dash.

10. The kit of claim 9, wherein:
- said small cross-section cable and said indicator lamp have adhesive affixed to them, said adhesive being covered by a release media so that said small cross-section cable and said indicator lamp can be secured in place by removing said release media and being pressed in place.

11. The kit of claim 8 for an automobile having a rear window, wherein:
- said mounting means includes a pedestal which may be secured to the bottom of said lamp housing whereby said lamp housing may be easily mounted inside the automobile adjacent the rear window.

12. The kit of claim 8 for an automobile having a rear window, wherein:
- said lamp housing includes a visor mount for receiving and mounting a visor;
- at least two visors, each having common means for being secured to said visor mount but having different-angled front surfaces providing adaptation to closely fit the interior surface of automobile rear windows of differing angles; and
- said housing being capable of being mounted outside of the window at the rear of an automobile or inside the rear window of an automobile of the type corresponding to one of the visors without initial reflection of light from the inside of the rear window by securing that visor to the housing and against the inside surface of the rear window.

13. The kit of claim 12, wherein:
- the window edge of the visors is made of foam so as to more closely conform to the inside surface of the rear window of the automobile.

14. The kit of claim 12, wherein:
- said visors have adhesive at their window edge so that they may be affixed to the inside surface of the window.

15. The kit of claim 8, wherein:
- said visors may be mounted to the housing in an inverted manner when the housing is installed outside of the rear window.

* * * * *